US009401085B2

(12) United States Patent
Markov et al.

(10) Patent No.: US 9,401,085 B2
(45) Date of Patent: Jul. 26, 2016

(54) CONTROL OF DEVICES THROUGH THE USE OF DIFFERENT COMMUNICATION INTERFACES

(75) Inventors: Stelian Markov, La Crescenta, CA (US); Brian Maso, Ladera Ranch, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 108 days.

(21) Appl. No.: 14/114,893

(22) PCT Filed: May 10, 2012

(86) PCT No.: PCT/US2012/037366
§ 371 (c)(1),
(2), (4) Date: Oct. 30, 2013

(87) PCT Pub. No.: WO2012/154982
PCT Pub. Date: Nov. 15, 2012

(65) Prior Publication Data

US 2014/0062679 A1 Mar. 6, 2014

Related U.S. Application Data

(60) Provisional application No. 61/485,608, filed on May 12, 2011.

(51) Int. Cl.
*G05B 11/01* (2006.01)
*G08C 19/00* (2006.01)
*G08C 17/02* (2006.01)

(52) U.S. Cl.
CPC ................ *G08C 19/00* (2013.01); *G08C 17/02* (2013.01); *G08C 2201/40* (2013.01); *G08C 2201/42* (2013.01); *G08C 2201/63* (2013.01); *G08C 2201/93* (2013.01)

(58) Field of Classification Search
CPC .... G08C 17/02; G08C 19/00; G08C 2201/40; G08C 2201/42; G08C 2201/93
USPC ........................................................ 340/12.2
See application file for complete search history.

(56) References Cited

U.S. PATENT DOCUMENTS

| | | | | |
|---|---|---|---|---|
| 5,822,544 | A * | 10/1998 | Chaco | G06F 19/327 340/286.07 |
| 6,590,504 | B1 | 7/2003 | Hermann | |
| 6,812,881 | B1 | 11/2004 | Mullaly et al. | |
| 7,068,143 | B2 | 6/2006 | Doering et al. | |
| 2005/0140521 | A1 | 6/2005 | Lin et al. | |
| 2006/0085579 | A1 | 4/2006 | Sato | |
| 2007/0019958 | A1 | 1/2007 | Calhoon | |
| 2008/0253772 | A1 | 10/2008 | Katsuyama | |
| 2009/0247097 | A1* | 10/2009 | Ha et al. | 455/143 |
| 2011/0107379 | A1* | 5/2011 | Lajoie et al. | 725/87 |

FOREIGN PATENT DOCUMENTS

| | | |
|---|---|---|
| CN | 1276464 | 12/2000 |
| CN | 1635719 | 7/2005 |
| CN | 1776765 | 5/2006 |
| CN | 101286265 | 10/2008 |
| CN | 201194132 | 2/2009 |
| CN | 101719855 | 6/2010 |
| CN | 201750483 | 2/2011 |
| EP | 1312332 | 5/2003 |
| JP | 2001/169368 | 6/2001 |
| JP | 2001169368 | 6/2001 |
| WO | 2009/117958 | 10/2009 |
| WO | WO2009117958 | 10/2009 |

* cited by examiner

*Primary Examiner* — Omeed Alizada
(74) *Attorney, Agent, or Firm* — Robert D. Shedd; Joel Fogelson; Patricia A. Verlangieri

(57) ABSTRACT

A method and a device for determining what commands can be used to operate a receiving device (110) when a user operates a control device (105). After such a determination is made, a first command is transmitted to the receiving device from the control device (105) over a first communication interface and a second command is transmitted to the receiving device (110) over 5 a second communication interface. The communication interface that is selected depends on whether the control device can control the operation of the receiving device (110) with such a command directly or whether an intervening device (130/140) is required to translate the command from a first format to a second format.

8 Claims, 3 Drawing Sheets

300

CONTROL OF DEVICES THROUGH THE USE OF DIFFERENT COMMUNICATION INTERFACES

CROSS-REFERENCE TO RELATED APPLICATIONS

This application claims the benefit, under 35 U.S.C. §365 of International Application PCT/US12/37366, filed May 10, 2012, which was published in accordance with PCT Article 21(2) on Nov. 15, 2012 in English and which claims the benefit of U.S. provisional patent application No. 60/485, 608, filed May 12, 2011.

FIELD OF THE INVENTION

The invention pertains to the field of having the communication of commands between two devices, particularly the communication between two devices where a first set of commands are communicated through a first communication interface and a second set of commands are communicated through a second communication interface.

BACKGROUND OF THE INVENTION

In a home setting, a user can use a display device and a set top box to display programming received from a multiple service provider (MSO) such as a cable, telephonic, satellite provider. In order to select different programming options, a user can also use a control device such as a tablet, phone, remote control to command the set top box to perform various actions including change channels, record a program, display an electronic program guide, and the like. In some cases, the commands sent from a control device to a set top box may not be supported because the commands themselves may not be recognized by the set top box. The commands from the control device may also be ignored by the set top box because there can be a set of commands which are proprietary to the set top where the set top box only responds to authorized control devices issuing such proprietary commands.

Specifically, a set top box can implement special applications such as electronic program guide lookups, record video, and the like which are supposed to be interoperable with an authorized class of control devices. Examples of the authorized class of control devices which can work with the set top box can include control devices that are from the same manufacturer as that of the set top box, the control devices have purchased licenses to run controllable applications on the set top box, the control devices are authenticated using various security protocols, and the like. Hence, there is an issue when a user wants to use unauthorized control device with a set top box device to control the recording or playback of media received from a MSO where different commands, statuses, and events message can be transmitted back and forth between such devices.

SUMMARY OF THE INVENTION

A method and a system are presented where between two devices a determination is made what commands can be supported from a control device to a receiving device. Once such a determination is made, a first command is transmitted over a first communication interface from the control device to the receiving device. The control device then transmits a second command over a second communication interface which is different than the first communication interface to the receiving device, as well. A server which is coupled to the control device and the receiving device through the second communication interface can translate the second command from a first format to a second format.

DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

DESCRIPTION OF THE PREFERRED EMBODIMENTS

The described embodiments can be applied to a typical deployment of consumer premises equipment from a MSO in a user's home. It is envisioned that the principles described below can apply to any type of setting where media such as audio, video, text, computer games, video games, and the like is received for recording and/or playback.

Figure 1:
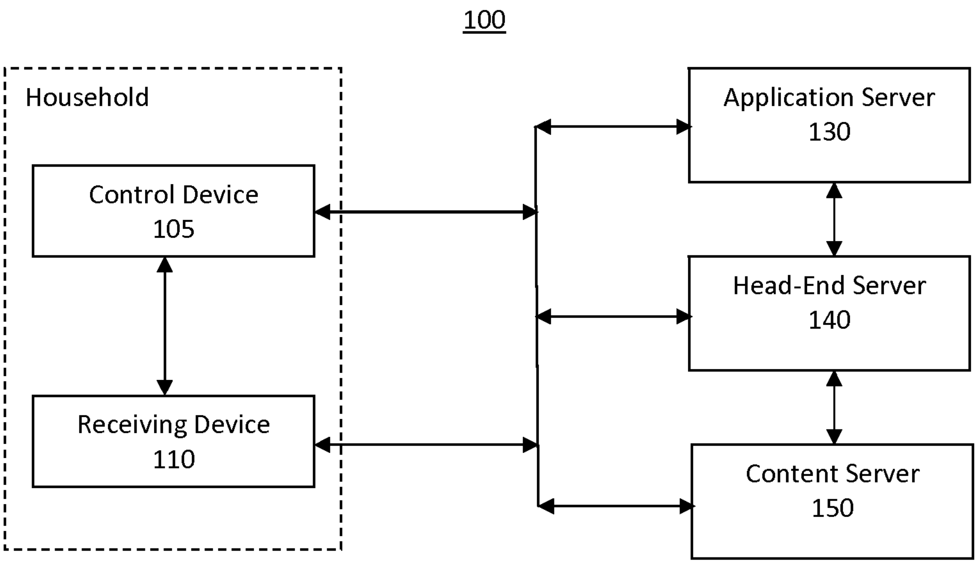
FIG. 1 is a block diagram of an exemplary system for delivering content in accordance with the present disclosure.

Referring now to FIG. 1, system 100, in accordance with one embodiment of the present used to receive media from a multiple services operator is shown. A communication interface that can be used between the devices in FIG. 1 can include radio frequencies, coaxial cable, fiber optic cable, telephone lines, digital subscriber lines, cable, T3, Ethernet, and the like. The devices of system 100 are capable of running computer enabled code through the use of one or more processors.

Control device 105 is a device such as a tablet, phone, computer, remote control, input device, personal access device, display device, and the like that can be used to control the selection and/or playback of media via receiving device 110. Specifically, control device 105 issues commands to receiving device 110 that are used to control the recording and/or playback of programming received from a MSO. In addition, the commands from control device 105 can be used to enable applications on receiving device 110 such as electronic program guide functions, video on demand purchase and playback, and the like. In an optional embodiment, control device 105 can playback media received through receiving device 110 by using techniques such as streaming or control device 105 can download media for later playback where such media is received through receiving device 110. Receiving device 110 can also be configured to communicate with application server 130, head end server 140, and content server 150.

Receiving device 110 can be a device such as a set top box, computer, display device, receiver, and the like that can receive media from an MSO. Receiving device 110 can be configured to operate with application server 130, head end server 140 of an MSO, and content server 150 in which media is stored. In one embodiment, control device 105 and receiving device 110 can communicate with each other using a first communication scheme such as using RF commands, while such devices can communicate with each other using a second communication format where application server 130 and head end server 140 operate as intermediaries for the second communication format as described below. Content server 150 can contain media audio, video, text, computer games, video games, and the like that is delivered to receiving device 110 for recording and/or playback.

Control device 105, receiving device 110, application server 130, head end server 140, and content server 150, can use a messaging scheme such as Enhanced TV Binary Interchange Format (EBIF) to communicate with any other device shown in FIG. 1, although other messaging schemes can be used. Typically, EBIF commands are transmitted using a device ID number (which can be a ID specific to a device, Media Access Control (MAC) address, IP address, and the like) of a destination device in the header of a packet and the ID number of an originating device in the packet payload.

In one embodiment, application server 130 is configured to interpret commands from control device 105 that are received over a communication interface. Specifically, a representational state transfer (REST) service is hosted on application server 130 which receives commands from control device 105. Using the REST nomenclature, the command is transmitted from the control device 105 to application server 130 using a Uniform Resource Identifier (URI) "/c3_ebif/stb_addressed_messages" which can be directed to a specific server, Internet Protocol address (IP), and the like. Note, while the relative URIs of the described services are identical in the examples provided in the specification of the present disclosure, the server names and IP addresses will differ. URIs can also be prefixed with a single path particle, where such prefixes can be modified based upon need.

Application server 130 then can forward the received command or status request to head end server 140 using an URI "/c3_ebif/stb_addressed_messages". Application server 130 can translate the received URI into an EBIF command which is then forwarded to receiving device 110 whereby the command is interpreted by an EBIF interpreter framework such as TVWork, EnableTV, application framework and the like which causes the receiving device 110 to perform the action specified in the EBIF command.

A reverse command path can be included with the embodiment of the present disclosure where receiving device 110 issues a command to head end server 140 using an EBIF format. Head end server interprets the EBIF command into a URI "/c3_ebif/stb_originated_messages" using a REST scheme which is transmitted to application server 130 using a REST PUT request command. Application server 130 can copy the command to a queue that is specific to the device specified in the previously stated URI, which in the present example is control device 105. Control device 105 can request from application server 130 any of the commands that are currently queued up, whereby such commands are deleted from the queue within application server 130 once the commands delivered. Application server 130 can also be configured to transmit received commands to control device 105 whenever such commands are received from head end server 140. It is noted that different embodiments of the explained principles can use a "push", "pull", or combination of such techniques in communicating commands between the devices of FIG. 1. For a REST framework, "push" commands are performed using PUT HTTP command while "pull" commands are performed using GET HTTP. Using this type of EBIF/REST technique, a mapping can be used to map a control device 105 to a receiving device 110 where remapping operation can be performed as devices are added or removed from a system as shown in FIG. 1.

Application server 130 in one embodiment of the present disclosure hosts a service that is used to send command messages received from a control device 105 to a receiving device 110 that is within the same household. A URI command such as "/c3_ebif/stb_addressed_messages" is used both to send commands and status requests. The implementation of this service relays the request to the /c3_ebif/stb_addressed_messages service hosted by the head end server 140.

The /c3_ebif/stb_addressed_messages endpoint supports the HTTP PUT verb. The content of each message is a single command or status request message. The MIME content-type supported by this service is "application/vnd.technicolor.c3_ebif.request.v1", which is the content-type identifier associated with the custom encoding. The request should include the identifier of the receiving device to which the request is addressed. This identifier is stored in a custom HTTP header "x-c3-ebif-stb-identifier". The STB-identifier value is the MAC address of the receiving device 110 to which the message is to be sent. The MAC address is listed in the identifier. Commands messages which make up the body of the HTTP request can be delivered in a pipe-delimited format that is described herein.

The service endpoint uses the same x-device-token/x-user-token HTTP headers for security used by the all other REST services. Therefore, application server 130 is able to deduce the originating control device 105 and receiving device 110 addressed in the HTTP header. Ideally, an identifier of a control device 105 should match the device associated with the x-device-token/x-user-token-header sent with a command message.

Head end server 140 hosts a service that is used to relay command messages from application server 130 to receiving device 110. The service endpoint /c3_ebif/stb_addressed_messages is used to both send commands and status messages between devices. In one embodiment of the present disclosure, the service routes messages to the addressed control device listed in stb_addressed_messages using an EBIF protocol.

When the service endpoint is used in a URI "/c3_ebif/stb_addressed_messages", a HTTP PUT command is used where the content of the message is a single command or status request message. The format of the message should identify the receiving device 110 to which such a request is addressed. The identifier is stored in a HTTP header "x-c3-ebif-stb-identifier". The stb-identifier value should be the MAC address of the control device 110 which should receive such a command. Commands messages which make up the body of the HTTP request can be delivered in a pipe-delimited format that is described herein.

Application server 130 can also be configured to host a service at URI "/c3_ebif/stb_originated_messages" which can be used to notify application server 130 of any commands issued by receiving device 110. Also, application server 130 can relay command and status request commands responses from receiving device 110 to control device 105. Focusing on the previously described queue, command or status messages can be accumulated by application server 130 which are then "pushed" to control device 105 after a certain period of time or are "pulled" by a request of information from control device 105 to application server 130.

The /c3_ebif/stb_originated_messages endpoint supports the HTTP PUT verb. The content of each message is a single command or status request message. The MIME content-type supported by this service is "text/www-url-formencoded", and the data content is ideally the same as the data sent from the receiving device 110 to application server 130. The /c3_ebif/stb_originaled_messages service on application server exists messages, with preferably little modification.

The HTTP request can identify the receiving device 110 which issued the message. This identifier is stored in a HTTP header "x-c3-ebif-stb-identifier" where the stb-identifier value is MAC address of receiving device 110. The header can also contain the location of a second receiving device that issued a command in a EBIF format (comparing out of band versus in band message). The body of the message body should contain information identifying the destination control device 105 which is supposed to receive a command. If a message is a command or a status response message, the identifier in the message should match the identifier of a control device 105 listed in the original destination identifier in the original request. If a message is an event message, then the identifier in the message should match the control device 105 that previously subscribed in order to be informed of event messages from receiving device 110.

Application server 130 is configured to operate a service in one embodiment of the present invention. The service is used to queue and eventually deliver command messages originating from receiving device 110 and addressed to any control device 105. The service endpoint /c3_ebif/device_queue is used both to receive commands, status responses, and event messages. The implementation of this service queues messages addressed to a control device 105. A response to a GET service request returns all queued messages addressed to a specific control device 105, and then clears these messages from the queue of application server 130.

The /c3_ebif/device_queue endpoint supports the HTTP GET command. The content of each message is a single command or status request message. The format of the message is an XML packaging of receiving device 110 response messages. The individual response messages are formatted the same as the command messages emitted by the command App in receiving device. The collection of messages is "wrapped" in a XML format which in an embodiment of the present disclosure packages a collection of command response messages in a single XML document, with a single root element. Individual response messages can also associate a source receiving device identifier (MAC address) with each command response message. The MIME content-type supported by this service is "text/xml", though the individual command response messages contained within the message are formatted according a content-type identifier "text/www-url-formencoded".

To process a request to a service, the request should include a control device 105 identifier whose queue is to be accessed. The identifier is provided by the normal REST service device token or user device token, which is required to be sent with the request. From the token, the application server 130 can deduce the device ID. The messages returned in the response will include all undelivered command response messages addressed to the device through the application server 130 /c3_ebif/stb_originated_messages service.

Application server 130 can run a service at "/c3_ebif/stb_addressed_messages" that translates and relays command requests to an implementation of the C3EBIFChannelFacade interface. The interface is designed to be a uniform facade for supporting a communication channel between the application server 130 and head end server 140. An implementation can support the "push" notification style of message exchange between the application server 130 and head end server 140 in both directions. The /c3_ebif/device_queue service also translates and queues command responses from the same C3EBIFChannelFacade interface.

The described interface is designed to support several operations including the relaying of messages originating from a control device 105 to a receiving device 110 using a "push" style message sending operation. Another operation provides the queued messages originating from a receiving device 110 which can be delivered to a control device 105 using a C3EBIFChannelFacade to receive events originating using a "pull" style message retrieval operation. Other supported operations provides a control device 105 to both register and unregister a specific interest in events originated from receiving device 110.

A JAVA implementation of the facade described above shown below:

```
public interface C3EBOFChannelFacade {
  /**
   * Send a C3 message to the identified STB
   **/
  public void send(String stbId, String messageContent) throws
  NaviSystemException;
  /**
   * Returns messages queued for the given device.
   *
   * @param deviceId Opaque identifier of a device. Used as an
  internal map key.
   * @param maxCount Maximum number of messages returned.
   *   Any value <= 0 is interpreted as "no limit", so a arbitrarily
   *   large number of queued messages may be returned.
   *
   * @returns A list of Tuple2<String, String>, which is a pairing of an
  STB
   *   identifier and a C3 message body. If <i>maxCount</i> > 0, then the
   *   list size is <= <i>maxCount</i>.
   **/
  public List<Tuple2<String, String>> receiveDeviceMessages(
     String deviceId, int maxCount) throws NaviSystemException;
}
```

Whenever there is a push/pull polarity reversal in a message-based system, a message queue is required to buffer messages for eventually delivery through a "pull" mechanism. The system described above has a push/pull polarity reversal in the sequence for receiving device 110 to control device 105. Specifically, head end server 140 pushes control messages to application server 130 through the /c3_ebif/stb_originated_messages REST service, and the control device 105 these messages from the application server 130 through the /c3_ebif/device_queue REST service.

This push/pull polarity reversal is exposed in the C3EBIFChannelFacade interface. The interface presents push method for sending command messages to receiving device 110 (send), and a pull method for retrieving messages addressed to a particular control device 105. (recieveDeviceMessages). Therefore, the queuing implementation is internal to the C3EBIFChannelFacade implementation, and is specific to the REST service-based interface implementation.

A custom pipe-delimited format is used to represent command, status request messages, and events for some embodiments of services described in this specification. Specifically, the some embodiments support that the described services use the exact same pipe-delimited command message format to facilitate message relay and delivery without requiring message parsing at the relay points. These services include in the application server 130 /c3_ebif/stb_addressed_messages REST service request body which the service that is used by the control device 105 to transmit messages to the receiving device 110, head end server 140's /c3_ebif/stb_addressed_messages REST service request body that is used to transmit messages between application server 130 and head end server 140 to receiving device 110. This format is also used for the facade interface described above.

A pipe-delimited format is used for transmitting commands where some of the described embodiments use the same type of XML format to minimize message relay and delivery without requiring message parsing at different relay points. That is, such commands would be found in the REST service request body of the /c3_ebif/stb_originated_messages service which is used to relay messages from receiving device 110 to application server 130. The C3EBIFChannelFacade command receiveDeviceMessages puts such information in the second member of the returned Tuple2 objects used to returned command message content. Additionally, the return value in the application server 130's /c3_ebif/device_queue service would have such wrapped in a transmitted XML document.

When a command message is encoded as an XML message body, a first message type is a command and status request messages which are messages originating from a control device 105 which targets a specific receiving device 110. Other message types including command responses, status responses, and spontaneous event messages are commands that originate from a receiving device to a control device 105 that is registered.

Command and status messages can be encoded in a custom binary, pipe-delimited format in some embodiments. The described format is already in use by EnableTV for EBIF communications. The message begins with a 2-byte "trigger value" 0x0001. The next two bytes of the message is a 2-byte big-endian integer length of the message, in bytes. More specifically, this value of this integer is the length of the rest of the message, not including the 2 "trigger value" bytes and the 2 message-length bytes. The remainder of the message is an ASCII-encoded, pipe-delimited payload. The message can be considered an array of string fields, where fields are separated by a pipe-character delimiter. The first field is always the ASCII decimal encoded message type code. The remaining fields are message-specific, both in number and content. The entire message is always terminated by a final pipe-character.

Figure 2:
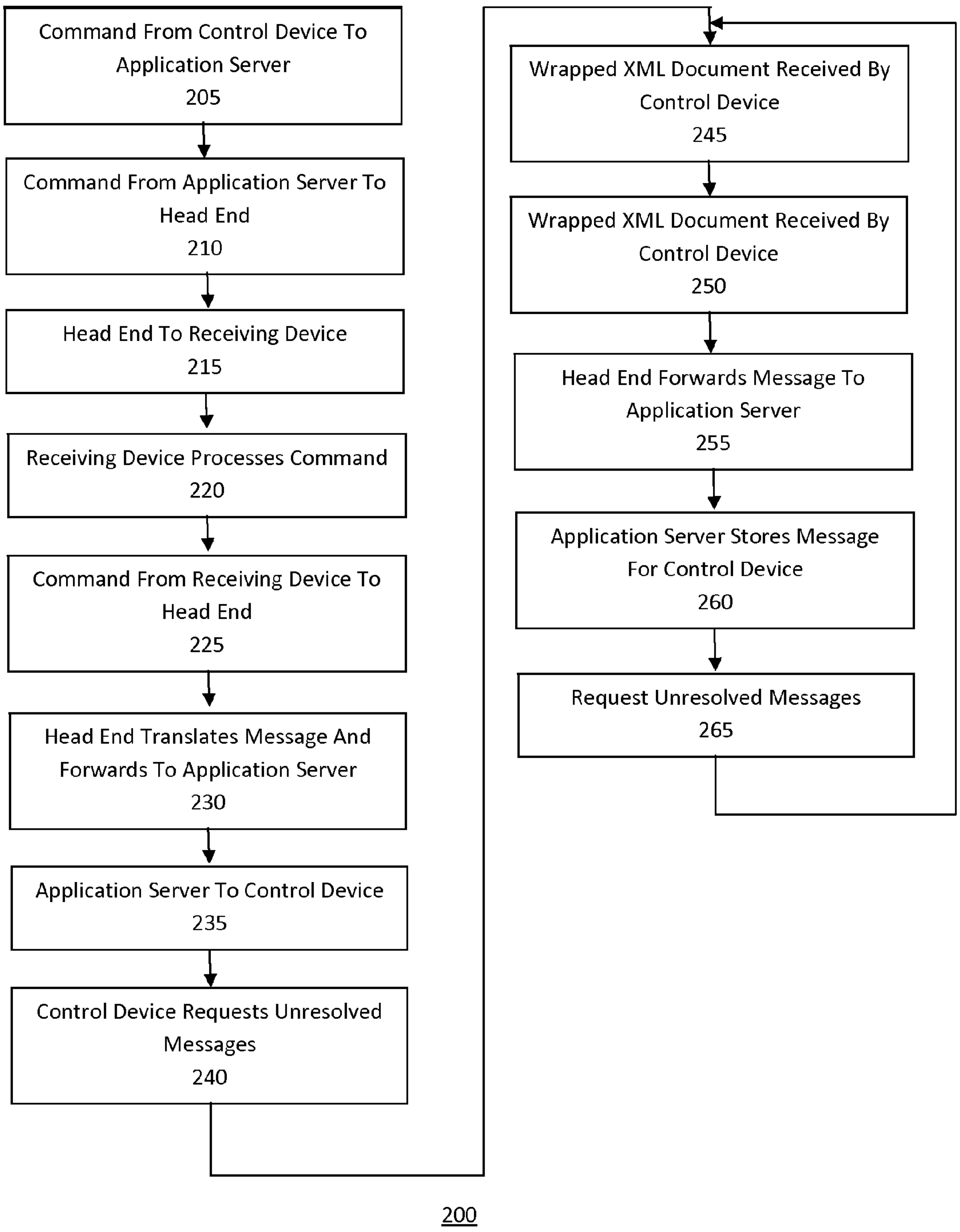
FIG. 2 is a flow chart of an method for delivering commands between different devices.

Referring to FIG. 2, a flowchart 200 is shown. Flowchart 200 describes a control device 105 issuing a channel change command to receiving device 110. In this embodiment, control device 105 has an ID "tabXYZ" and receiving device 110 has a MAC address of "00-B0-D0-86-BB-F8". The request for the change channel command is for virtual channel "5". Previously, control device 105 has obtained a device token from application server 130 which comports to "CAFEBABE".

In step 205, control device 105 sends a command in a pipe-delimited format to application server 130. The format of the command is:

```
# HTTP PUT request to /c3__ebif/stb__addressed__messages
# HTTP header
Content-type: application/vnd.technicolor.c3__ebif.request.v1
x-c3-ebif-stb-identifier: 00-B0-D0-86-BB-F8
x-device-token: CAFEBABE
# Message body
[[0x00 0x01 0x00 0x0C
   0x7C 0x74 0x61 0x62
   0x58 0x59 0x5A 0x7C
   0x34 0x7C 0x35 0x7C]]
# Explanatatory breakdown of the message body
# [[0x00 0x01]] - trigger word
# [[0x00 0x0C]] - msg length word
# "|tabXYZ"    - source device ID
# "|4"         - message type
# "|5"         - arg. to msg -- virtual channel number
# "|"          - terminating pipe char
    # HTTP 200 response
```

In step 210, application server 130 forwards the command message in a pipe-delimited format to head end server 140 using the following format:

```
# HTTP PUT request to /c3__ebif/stb__addressed__messages
# HTTP header
Content-type: application/vnd.technicolor.c3__ebif.request.v1
x-c3-ebif-stb-identifier: 00-B0-D0-86-BB-F8
# Message body
[[0x00 0x01 0x00 0x0C
   0x7C 0x74 0x61 0x62
   0x58 0x59 0x5A 0x7C
   0x34 0x7C 0x35 0x7C]]
# Explanatatory breakdown of the message body
# [[0x00 0x01]] - trigger word
# [[0x00 0x0C]] - msg length word
# "|tabXYZ"    - source device ID
# "|4"         - message type
# "|5"         - arg. to msg -- virtual channel number
# "|"          - terminating pipe char
    # HTTP 200 response
```

In step 215, head end server 140 forwards the command message in a pipe-delimited format to receiving device 110. Head end server 140 resolves the targeted receiving device MAC address listed in the message in the format of:

```
# Send via EBIF to STB known by MAC address 00-0B-D0-86-BB-F8
# Message body
[[0x00 0x01 0x00 0x0C
   0x7C 0x74 0x61 0x62
   0x58 0x59 0x5A 0x7C
   0x34 0x7C 0x35 0x7C]]
     # Explanatatory breakdown of the message body
# [[0x00 0x01]] - trigger word
# [[0x00 0x0C]] - msg length word
# "|tabXYZ"    - source device ID
# "|4"         - message type
# "|5"         - arg. to msg -- virtual channel number
# "|"          - terminating pipe char
```

In step 220, receiving device 110 processes a received command. After some point, at step 225, receiving device 110 sends a command to the head end server 140 through a HTTP request where the message contents are encoded as part of as a name/value pair. Optionally, head end server 140 confirms the receipt of the message via an XML backchannel. The format of the message from receiving device 110 to head end server 140 is:

```
# HTTP POST request to <undocumented endpoint URI?>
# HTTP header
Content-type: text/www-url-formencoded
# Message body (line breaks are for doc purposes only)
# <undocumented name/value pairs?>
```

In step 230, head end server 140 translates the received message to a binary pipe-delimited format which is then forwarded to application server 130. The format of the translated message is:

```
# HTTP PUT request to /c3__ebif/stb__originated__messages
# HTTP header
Content-type: text/www-url-formencoded
x-c3-ebif-stb-identifier: 00-B0-D0-86-BB-F8
x-c3-ebif-client-identifier: tabXYZ
# < undocumented name/value pairs?>
```

In step 235, the application server 130 resolves the target control device 105 using the ID embedded in the command response message. A copy of the message, along with the MAC address of the receiving device 110 is placed in a queue in application server 130 which is associated with the control device 105. In step 240 control device 105 eventually requests messages that are in the queue within application server 130 where other messages can also be stored. Such messages are delivered in the form of an XML document as shown below:

```
# HTTP response from request
# HTTP header
Content-type: text/xml
# Message body (line breaks are for doc purposes only)
<Responses>
  <Response>
    <stb>00-B0-D0-86-BB-F8</stb>
    <message><!CDATA[[
# <undocumented name/value pairs?>
    ]]!></message>
  </Response>
</Responses>
```

In step 245, control device 105 parses the received XML document and processes the enclosed messages.

In step 250, receiving device 110 informs head end server 140 that a change channel command was successful. The contents of the message are encoded as a set of name/value pairs. Optionally, head end server 140 confirms the receipt of the message via an XML backchannel. Step 255 has head end server 140 translating the message into a binary pipe-delimited format where such a message is forwarded to application server 130.

In step 260 has application server 130 resolve the intended control device 105 as the target of the message where a copy of the response message "channel changed" and an ID of the receiving device 110 are sent along. In step 265, control device 105 eventually requests the contents of the message queue in application server 130.

Figure 3:
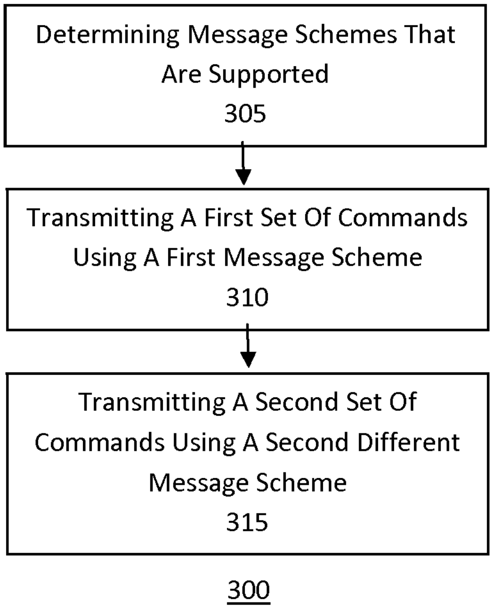
FIG. 3 is a flow chart a method for determining different communication interfaces to use when transmitting commands between devices.

Referring now to FIG. 3, a flowchart 300 is shown. Flowchart 300 is directed towards determining a message scheme to be used between two devices. In step 305, a receiving device 110 can run a program to determine the identity of control device 105 using a discovery mechanism such as universal plug and play (UPnP), device look up through High-Definition Multimedia Interface (HDMI), running of an application on receiving device 110 which determines the applications supported on control device 105, information received from a remote server, IP address lookup, and other techniques. From such information, the receiving device can determine that control device 105 is authorized to issue certain commands while other commands are restricted. For example, an authorized command can be a command to increase or decrease the volume outputted by receiving device 110. An unsupported command if received from control device 115 can be a record channel or EPG information command.

As an optional part of step 305, once the receiving device 110 recognizes the commands that are to be supported, receiving device 110 informs control device 105 of the set of commands that are supported if such devices are capable of interfacing with each other. For example, an RF interface using infrared can be used while the communication scheme of FIG. 2 can also be used, if supported.

In step 310, control device 105 communicates a supported command as part of a set of commands to receiving device 110 through a first communication interface. In step 315, the control device 105 communicates a second command, as part of a second set of commands using a second communication interface. An embodiment of this second communication interface in accordance with the present disclosure as described in relation to FIG. 2, although other embodiments can be used and are considered within the scope of the present disclosure.

In a first embodiment, a communication interface is a connection that physically couples control device 105 and receiving device 110 without any intervening servers or other devices. In a second embodiment, a communication interface can also be a coupling between control device 105 and receiving device 110 where the communications between both devices take place through other devices and/or servers in accordance with the present disclosure as described in relation to FIG. 2.

Examples of different commands are shown in Table I which can affect the operation of control device 110, when such commands are issued from a control device 105. Note, an open command can transmitted over a first communication interface and a restricted command can be transmitted over a second communication interface. Such a determination can be made in response to information received from a receiving device 110 in response to the discovery techniques listed above in accordance with an embodiment of the present disclosure. In another embodiment of the present disclosure, a control device 105 can poll receiving device 110 to determine what commands as either being restricted or open, when determining which communication interface should be used when transmitting such commands. The format of a transmitted command can also be affected by whether such a command is restricted or open. For example, open commands can be RF signals, XML, text, and the like. Restricted commands can be in a format such as EBIF, UPnP, HDMI, and the like which can be translated into a second format, if required.

TABLE I

| Command | Description | Restricted/Open Command |
|---|---|---|
| Increase Volume | Increase the volume outputted by receiving device 110. | Open |
| Decrease Volume | Decrease the volume outputted by receiving device 110. | Open |
| Channel Up | Tune to a channel with a higher channel number | Open |
| Channel Down | Tune to a channel with a lower with a lower channel number. | Open |
| Tune to a specified channel. | Tune to a channel with a specific channel number. | Restricted |
| Show electronic program guide information. | Show electronic program guide information in response to a command. | Restricted |

The classification of restricted and open commands can change depending on the deployment of devices, software upgrades, hardware upgrades, and the like. That is, in accordance with an embodiment with the present principles, the same commands for different devices can be classified differently. For example, when a first control device 105 communicates with a receiving device 110, a command can be classified as being open. When a second control device 105 communicates with the same receiving device 110, the same command can be classified as being restricted.

In an embodiment in accordance with the present principles, if a command is determined to be a "restricted" command when being issued from control device 105 to receiving device 110, control device 105 may not know if an issued command was successfully transmitted to receiving device 110. Hence, an intervening device such as application server 130 can be used to indicate when command caused receiving device 110 to perform a desired operation. That is, receiving device 110 can issue a message through head end server 140 to application server 130 indicating an operation desired operation was successful. One embodiment in accordance with the present principles provides that the receiving device 110 issues such messages when the device lacks knowledge about what device initially issued a command to which receiving device 110 responded to. In another embodiment in accordance with the present principles, receiving device 110 issue that a received command was successful when the receiving device recognizes that control device 105 issued a command but such a command is a restricted command, and not an open command.

In an embodiment of the present disclosure, a mixture of the first and second embodiments can be employed. It should be understood that the elements shown in the figures can be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for informational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes that can be substantially represented in computer readable media and so executed by a computer or processor, whether or not such computer or processor is explicitly shown. The computer readable media and code written on can be implemented in a transitory state (signal) and a non-transitory state (e.g., on a tangible medium such as CD-ROM, DVD, Blu-Ray, Hard Drive, flash card, or other type of tangible storage medium).

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Although embodiments which incorporate the teachings of the present disclosure have been shown and described in detail herein, those skilled in the art can readily devise many other varied embodiments that still incorporate these teachings. It is noted that modifications and variations can be made by persons skilled in the art in light of the above teachings.

The invention claimed is:

1. A method for communicating commands between a control device and a receiving device, the method comprising:

receiving, at the control device, a set of supported commands;

receiving, at the control device, at least one command;

determining whether the at least one command is included in the set of supported commands; and determining whether to transmit the at least one command through a first communication interface and a second communication interface to the receiving device, wherein the second communication interface comprises a server and the first communication interface comprises a directly connected wireless link, wherein the set of supported commands are transmitted through the first communication interface;

wherein the determination of whether to transmit through the first and second communication interface is made in response to the at least one command to be transmitted as being from the set of supported commands and a restricted command that is not included in the set of supported commands, wherein the restricted command is transmitted over the second communication interface.

2. The method of claim 1 where said at least one command is transmitted to said server in a first format where said commands are translated by said server into a second format for transmission to said receiving device.

3. The method of claim 2 where said first format is a Representational State Transfer (REST) format and said second format is an Enhanced TV Binary Interexchange Format (EBIF) format.

4. The method of claim 2 wherein said server translates a second at least one command received from said receiving device from said second format to a first format when said second at least one command is being transmitted to the control device that transmitted said at least one command.

5. A system for communicating commands between a control device and a receiving device, the system comprising:

receiving, at the control device, a set of supported commands;

receiving, at the control device, at least one command;

determining whether the at least one command is included in the set of supported commands; and determining whether to transmit the at least one command through a first communication interface and a second communication interface to the receiving device, wherein the second communication interface comprises a server and the first communication interface comprises a directly connected wireless link, wherein the set of supported commands are transmitted through the first communication interface;

wherein the determination of whether to transmit through the first and second communication interface is made in response to the at least one command to be transmitted as being from the set of supported commands and a restricted command that is not included in the set of supported commands, wherein the restricted command is transmitted over the second communication interface.

6. The system of claim 5 wherein said at least one command is transmitted to said server in a first format wherein said commands are translated by said server into a second format for transmission to said receiving device.

7. The system of claim 6, wherein said first format is a Representational State Transfer (REST) format and said second format is an Enhanced TV Binary Interexchange Format (EBIF) format.

8. The system of claim 6, wherein said server translates a second at least one command received from said receiving device from said second format to a first format when said second at least one command is being transmitted to the control device that transmitted said at least one command.

* * * * *